(12) United States Patent
Garner et al.

(10) Patent No.: US 9,756,776 B2
(45) Date of Patent: Sep. 12, 2017

(54) SEED METERING SYSTEM AND METHOD OF OPERATING THE SAME

(71) Applicant: Deere & Company, Moline, IL (US)

(72) Inventors: Elijah B. Garner, Bettendorf, IA (US); Beth A. Wolfs, Tiffin, IA (US); Nathaniel Pearson, Moline, IL (US)

(73) Assignee: Deere & Company, Moline, IL (US)

( * ) Notice: Subject to any disclaimer, the term of this patent is extended or adjusted under 35 U.S.C. 154(b) by 49 days.

(21) Appl. No.: 14/871,515

(22) Filed: Sep. 30, 2015

(65) Prior Publication Data

US 2017/0086351 A1 Mar. 30, 2017

(51) Int. Cl.
| | | |
|---|---|---|
| A01C 7/04 | (2006.01) | |
| A01C 5/06 | (2006.01) | |
| A01C 7/08 | (2006.01) | |
| A01C 7/10 | (2006.01) | |

(52) U.S. Cl.
CPC ............ *A01C 7/046* (2013.01); *A01C 5/062* (2013.01); *A01C 7/04* (2013.01); *A01C 7/082* (2013.01); *A01C 7/105* (2013.01)

(58) Field of Classification Search
CPC .... A01C 7/04; A01C 7/08; A01C 7/10; A01C 7/105; A01C 7/088; A01C 5/06; A01C 7/082
USPC ......................................................... 111/177
See application file for complete search history.

(56) References Cited

U.S. PATENT DOCUMENTS

| | | | |
|---|---|---|---|
| 4,638,748 A | 1/1987 | Kopecky | |
| 4,779,765 A | 10/1988 | Neumeyer | |
| 5,351,635 A | 10/1994 | Hulicsko | |
| 5,826,523 A | 10/1998 | Gregor | |
| 6,192,813 B1 | 2/2001 | Memory et al. | |
| 6,688,244 B1 | 2/2004 | Meyer et al. | |
| 6,935,255 B2 | 8/2005 | Hagen et al. | |
| 7,353,760 B2 | 4/2008 | Mayerle et al. | |
| 7,509,915 B2 * | 3/2009 | Memory ............... | A01C 7/082 111/174 |
| 7,555,990 B2 | 7/2009 | Beaujot | |

(Continued)

FOREIGN PATENT DOCUMENTS

| | | |
|---|---|---|
| EP | 2196079 | 6/2010 |
| EP | 2765398 | 8/2014 |

(Continued)

OTHER PUBLICATIONS

Office Action from the U.S. Appl. No. 14/871,633 dated Jan. 19, 2017 (13 pages).

(Continued)

*Primary Examiner* — John G Weiss
(74) *Attorney, Agent, or Firm* — Michael Best & Friedrich LLP (57) ABSTRACT

A seed metering system for selectively metering a plurality of seeds includes an outlet of a source of seeds. A singulating meter is in selective communication with the outlet. A bypass conduit is in selective communication with the outlet. The seed metering system is operable in a first mode of operation in which the outlet communicates with the singulating meter to singulate the plurality of seeds. The seed metering system is further operable in a second mode of operation in which the outlet communicates with the bypass conduit and the plurality of seeds is not singulated.

14 Claims, 8 Drawing Sheets

(56) References Cited

U.S. PATENT DOCUMENTS

| | | | |
|---|---|---|---|
| 7,938,075 B1* | 5/2011 | Glendenning | A01C 7/046 111/185 |
| 8,132,521 B2 | 3/2012 | Snipes et al. | |
| 8,281,724 B2 | 10/2012 | Snipes | |
| 8,350,689 B2 | 1/2013 | Mariman et al. | |
| 9,043,949 B2 | 6/2015 | Liu et al. | |
| 9,488,512 B2 | 11/2016 | Hossain et al. | |
| 9,596,803 B2 | 3/2017 | Wendte et al. | |
| 2003/0133759 A1 | 7/2003 | Winther | |
| 2007/0266917 A1* | 11/2007 | Riewerts | A01C 7/046 111/200 |
| 2009/0079624 A1 | 3/2009 | Dean et al. | |
| 2012/0226461 A1 | 9/2012 | Kowalchuk | |
| 2014/0165890 A1 | 6/2014 | Graham | |
| 2014/0216314 A1 | 8/2014 | Bourgault et al. | |
| 2014/0311598 A1* | 10/2014 | Hui | A01C 7/084 137/556.6 |
| 2015/0090166 A1* | 4/2015 | Allgaier | A01C 21/005 111/184 |
| 2015/0223392 A1 | 8/2015 | Wilhelmi et al. | |
| 2016/0037713 A1 | 2/2016 | Wendte et al. | |
| 2016/0095274 A1* | 4/2016 | Wendte | A01C 21/005 111/177 |
| 2016/0120107 A1 | 5/2016 | Chahley et al. | |
| 2016/0121284 A1 | 5/2016 | Roberge et al. | |
| 2016/0135359 A1 | 5/2016 | Kowalchuk et al. | |
| 2016/0157417 A1* | 6/2016 | Funck | A01C 7/04 111/174 |
| 2016/0234996 A1* | 8/2016 | Sauder | A01C 21/005 |
| 2016/0295792 A1* | 10/2016 | Secrest | A01C 21/005 |
| 2016/0302353 A1 | 10/2016 | Wendte et al. | |
| 2017/0086352 A1 | 3/2017 | Frasier et al. | |
| 2017/0086355 A1 | 3/2017 | Borkgren et al. | |
| 2017/0086356 A1 | 3/2017 | Schweitzer et al. | |

FOREIGN PATENT DOCUMENTS

| | | |
|---|---|---|
| EP | 3000299 | 3/2016 |
| FR | 2973790 | 10/2012 |
| WO | 2015094108 | 6/2015 |

OTHER PUBLICATIONS

Office Action from the U.S. Appl. No. 14/871,653 dated Jan. 31, 2017 (13 pages).

Office Action from the US Patent and Trademark Office for U.S. Appl. No. 14/871,633 dated Jul. 6, 2017 (13 pages).

Office Action from the US Patent and Trademark Office for U.S. Appl. No. 14/871,653 dated Jul. 17, 2017 (13 pages).

* cited by examiner

SEED METERING SYSTEM AND METHOD OF OPERATING THE SAME

BACKGROUND

The present disclosure relates to a seeding system and more particularly to a seed metering system and an associated method of metering seed.

SUMMARY

Current seeding practices tend to involve one of two types of seeding systems: planters and air seeders. Planters generally singulate or individually meter seeds prior to planting and are generally used to disperse seeds where precise placement is required for maximum yield and the seeding rate permits use of singulating technologies. Air seeders generally meter seeds volumetrically and are generally used in high rate seeding applications and where precise seed placement is of less importance or not practical due to the high rates.

A seed metering system for selectively metering a plurality of seeds includes an outlet of a source of seeds. A singulating meter is in selective communication with the outlet. A bypass conduit is in selective communication with the outlet. The seed metering system is operable in a first mode of operation in which the outlet communicates with the singulating meter to singulate the plurality of seeds. The seed metering system is further operable in a second mode of operation in which the outlet communicates with the bypass conduit and the plurality of seeds is not singulated.

A secondary metering system for a seeding apparatus, in which the seeding apparatus includes a primary metering system through which a plurality of seeds passes, includes a first path through which the plurality of seeds is configured to pass. The first path includes a singulating meter in selective communication with the primary metering system to singulate the plurality of seeds. The secondary metering system also includes a second path through which the plurality of seeds is configured to pass. The second path includes a bypass conduit in selective communication with the primary metering system. The second path bypasses singulation by the singulating meter.

A method of operating a metering system to meter a plurality of seeds includes operating the metering system in a first mode. The first mode includes a step of volumetrically metering a first portion of the plurality of seeds via a volumetric meter. The first mode also includes a step of singulating the first portion of the plurality of seeds via a singulating meter. The first mode further includes discharging the first portion of the plurality of seeds from the singulating meter.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
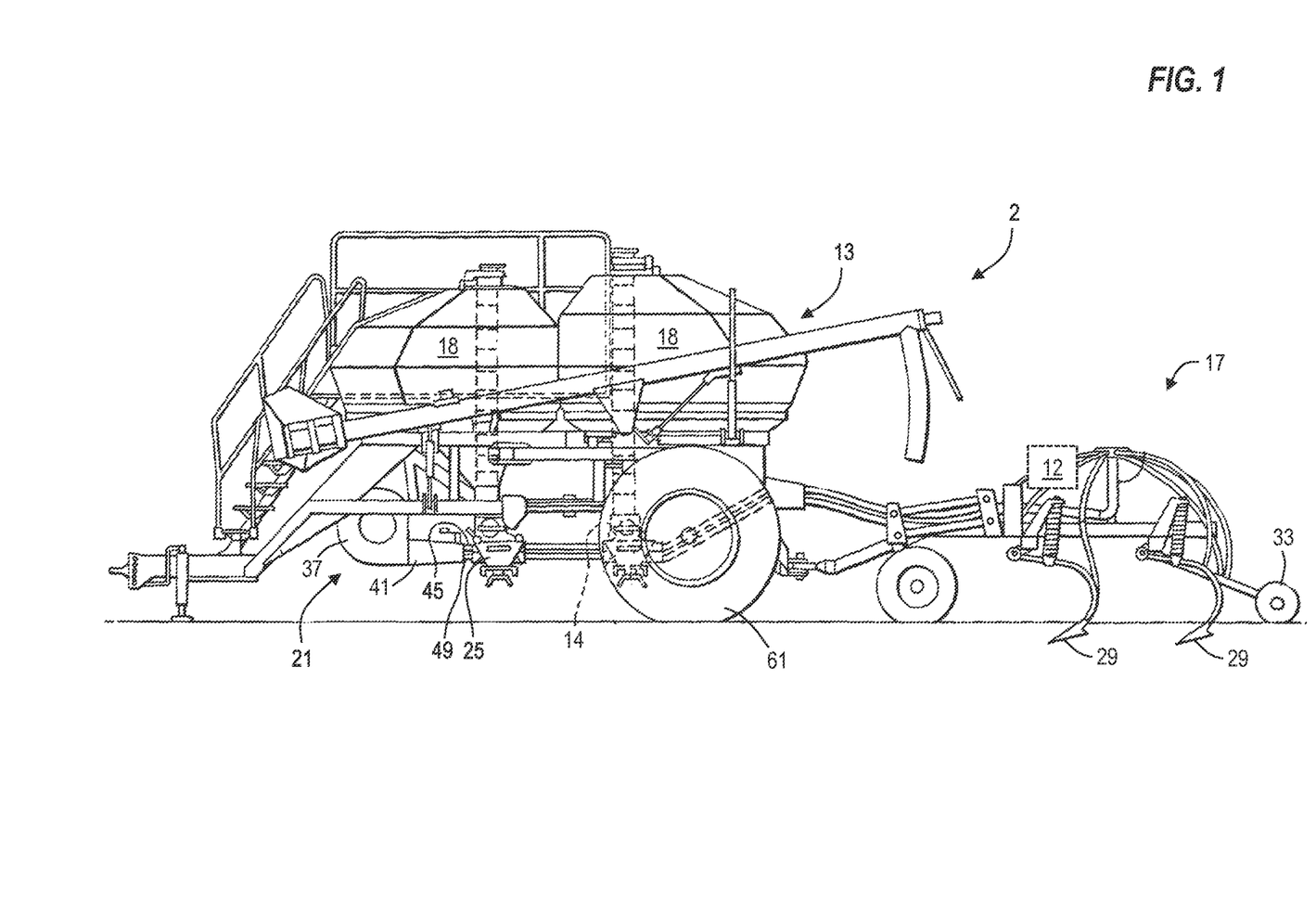
FIG. 1 is a side view of a seeding machine.

As shown in FIG. 1, seeding machine 2 comprises a seed cart 13 and a tilling implement 17. The seed cart is typically towed by a tractor through a field to be seeded. The seed cart 13 has a frame supporting a number of storage tanks 18 and wheels 61 are rotatably mounted to the frame. Each storage tank 18 is provided with a volumetric meter 14. The volumetric meters 14 are located below the storage tanks 18 and receive product therefrom for controlled feeding of product into a pneumatic distribution system 21. Located below each volumetric meter 14 is a primary air distribution manifold 25, part of the pneumatic distribution system 21. The tilling implement 17 comprises a frame to which ground openers 29 are mounted. The tilling implement 17 may be provided with seed row finishing equipment such as packers 33. FIG. 1 illustrates a double shot air seeder wherein a first product contained in one of the storage tanks 18 is directed to the top rank portion 45 of the air stream and the second product contained in the other of the storage tanks 18 is directed to the bottom rank portion 49 of the air stream. Triple shot applications in which three products are added to three different rank portions of the air stream are also utilized in certain situations.

The pneumatic distribution system 21 distributes metered product from the storage tanks 18 to the ground openers 29. The product contained in the storage tanks 18 may include seed, fertilizer or other agricultural particles. The pneumatic distribution system 21 comprises a blower 37 driven by a motor which directs a stream of pressurized air through an adjustable damper 41, which directs the air stream into a top rank portion directed into an upper rank of first tubes 45 and a bottom rank portion directed into a bottom rank of first tubes 49.

Figure 2:
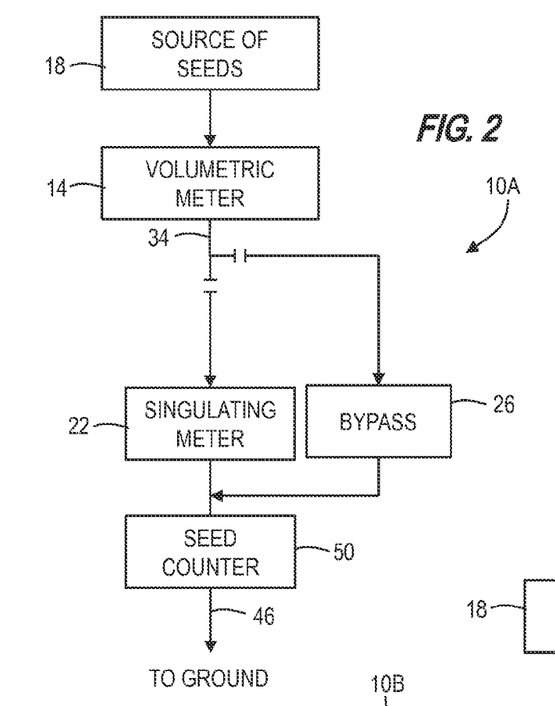
FIG. 2 is a schematic representation of a seed metering system.
Figure 3:
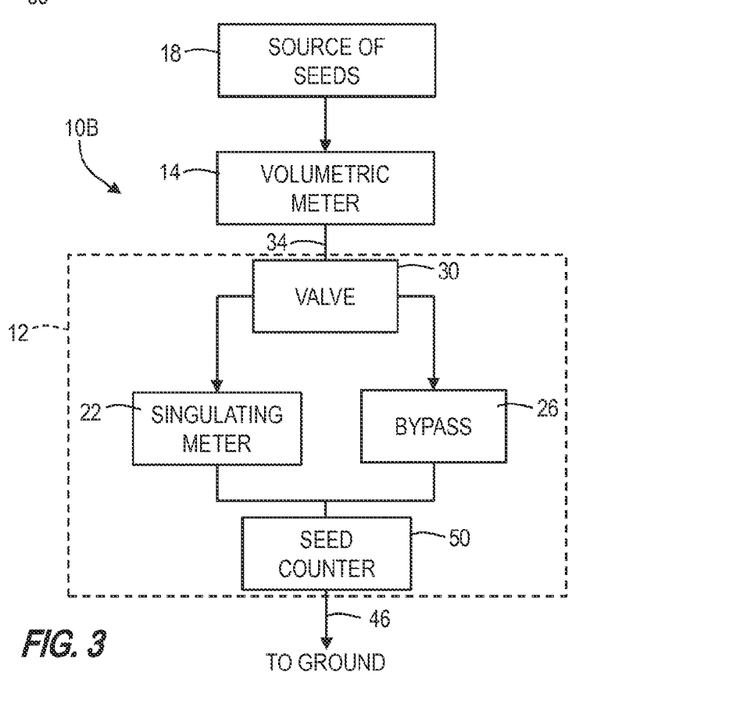
FIG. 3 is a schematic representation of another seed metering system.

FIGS. 2-3 schematically illustrate seed metering systems 10A, 10B for use in a planting operation, such as seeding a field or dispersing agricultural particles (e.g., fertilizer, etc.). Throughout this application, when referring to seeds or seeding, it is understood that one skilled in the art could equally apply the seed metering system 10A, 10B to agricultural particles and the dispersing of the agricultural particles. The seed metering systems 10A, 10B can be used with or as a part of the seeding machine 2.

Each seed metering system 10A, 10B includes a volumetric meter 14, which receives and meters the seeds or agricultural particles from the source 18 in the form of a tank, hopper, air cart, mobile seed storage device, or other bulk container as previously described and illustrated in FIG. 1. When volumetrically metered, the seeds travel one of two separate paths to either a singulating meter 22 or a bypass assembly having a bypass conduit 26.

Referring to FIG. 2 and seed metering system 10A, the paths may include a single supply line 34 having an inlet fixed to the outlet of the volumetric meter 14 and a discharge interchangeable between the singulating meter 22 and the bypass conduit 26. If a user of the seed metering system 10A decides to only volumetrically meter the seeds, the path from the volumetric meter 14 may be manually disconnected from the singulating meter 22 and connected instead to the bypass conduit 26. If the user decides to singulate the seeds, the path from the volumetric meter 14 may be manually disconnected from the bypass conduit 26 and connected to the singulating meter 22. The unused inlet would be capped or otherwise blocked. Other conduit arrangements that alternate the flow path between the volumetric meter and the singulating meter 22 or the bypass conduit 26 are of course contemplated with the present disclosure.

As shown in FIG. 3, in the embodiment of seed metering system 10B a control system or assembly in the form of a control valve 30 may be actuated to change the path of the seeds between the singulating meter 22 and the bypass conduit 26. As will be further described below, the singulating meter 22, bypass conduit 26, and valve 30 can be formed as one packaged unit or subassembly 12 (shown schematically in FIG. 1). In other embodiments, the valve 30 may be remotely located from the meter 22 and bypass assembly nearer the volumetric meter 14.

The seed metering systems 10A, 10B are each therefore capable of functioning in two separate and mutually exclusive modes. The first mode involves metering the seeds twice, first metering the seeds volumetrically and then singulating the seeds, i.e., separating individual seeds from the volumetrically metered group of seeds and then introducing the seeds to the planting site. The second mode involves metering the seeds volumetrically and then bypassing the singulating meter 22 to introduce the seeds directly to the planting site.

Figure 4:
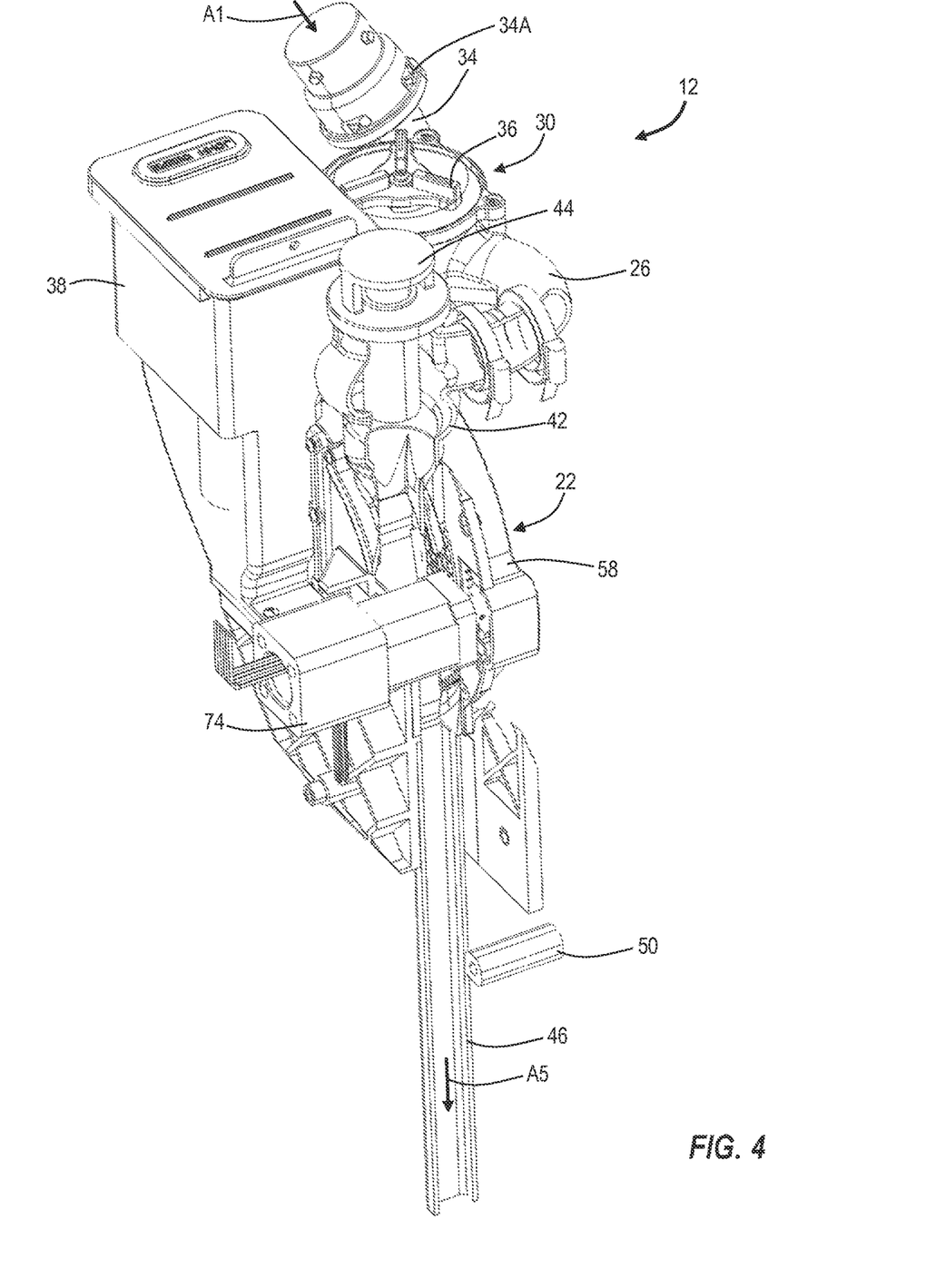
FIG. 4 is a perspective view of a singulating meter and bypass assembly including a partial cutaway of various components.
Figure 5:
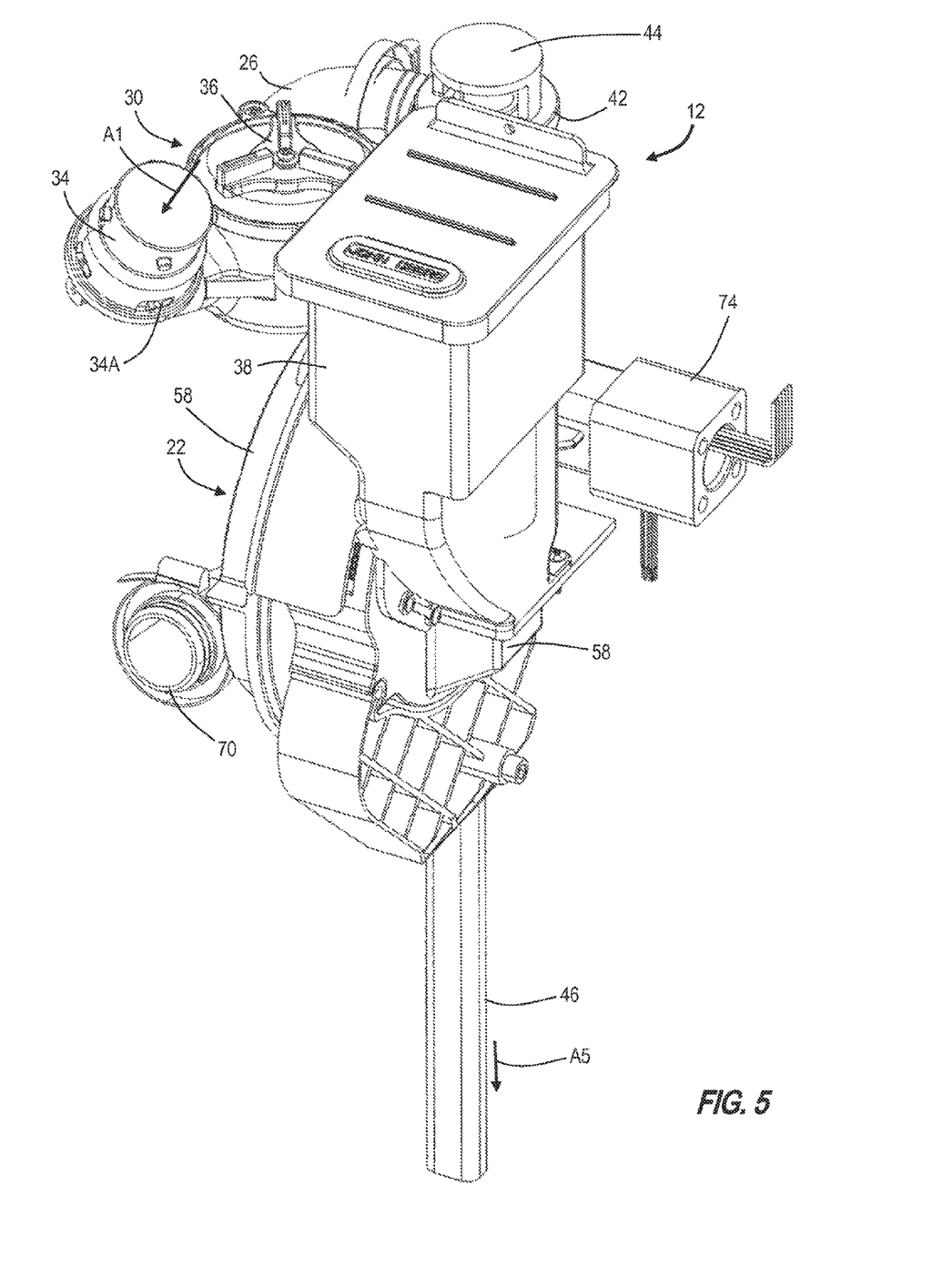
FIG. 5 is another perspective view of the meter and assembly of FIG. 4.
Figure 6:
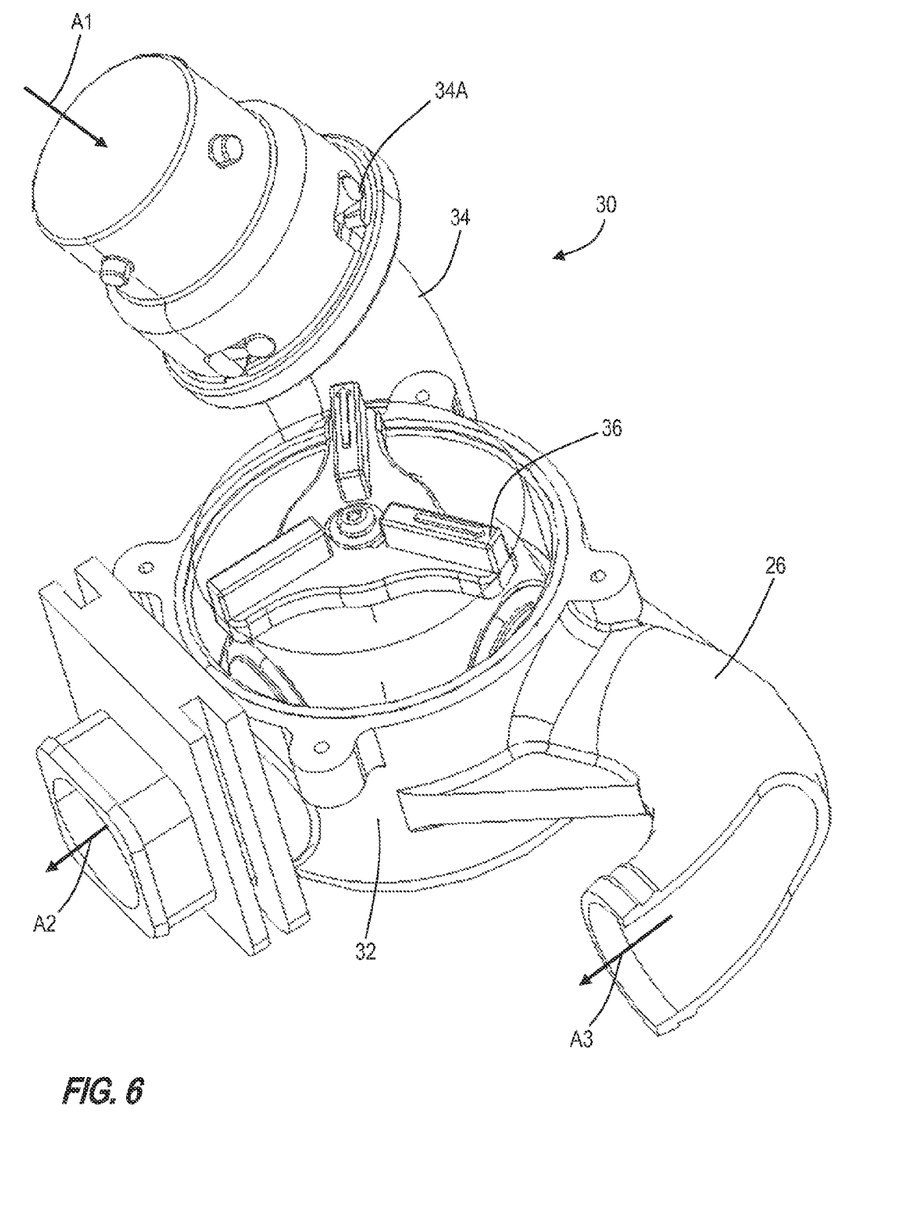
FIG. 6 is a perspective view of a valve of the meter and assembly of FIG. 4.

FIGS. 4-5 show perspective views of the seed metering system 10B downstream of the volumetric meter 14, i.e., the seed metering subassembly 12. The supply line 34 (or an end portion of the supply line 34 having a conduit connector 34A permitting the seed metering subassembly 12 to be removably securable to the volumetric meter 14) leads to the valve 30. The valve 30 comprises a housing 32 (the entirety of which is not shown—see FIG. 6) and a rotatable or otherwise actuatable valve assembly 36 capable of directing seeds towards one of two paths. Referring also to FIG. 6, the valve 30 may therefore take any form of functional three-way valve and may be actuated manually, automatically (e.g., hydraulically or electrically), either directly or remotely. The first path (which is associated with the first mode) leads to the singulating meter 22 and the second path (which is associated with the second mode) leads to the bypass conduit 26.

In the first mode, the valve 30 places the volumetric meter 14 in communication with a mini hopper 38. The mini hopper 38 is capable of holding and temporarily storing a quantity of seeds, the quantity less than that retained at the source 18. The mini hopper 38 can be a separate container adjacent to a housing 58 of the singulating meter or, alternatively, integrally formed as one piece with the singulating meter housing 58. The mini hopper 38 includes two openings. The first opening, or mini-hopper inlet (not shown), accepts seeds from the valve 30, and the second opening, or mini hopper outlet 62 (FIG. 8), discharges the seeds to a point of entry of the singulating meter 22, i.e., into the interior of the meter housing 58. Therefore, the mini hopper outlet 62 may also be considered a singulating meter inlet.

Figure 7:
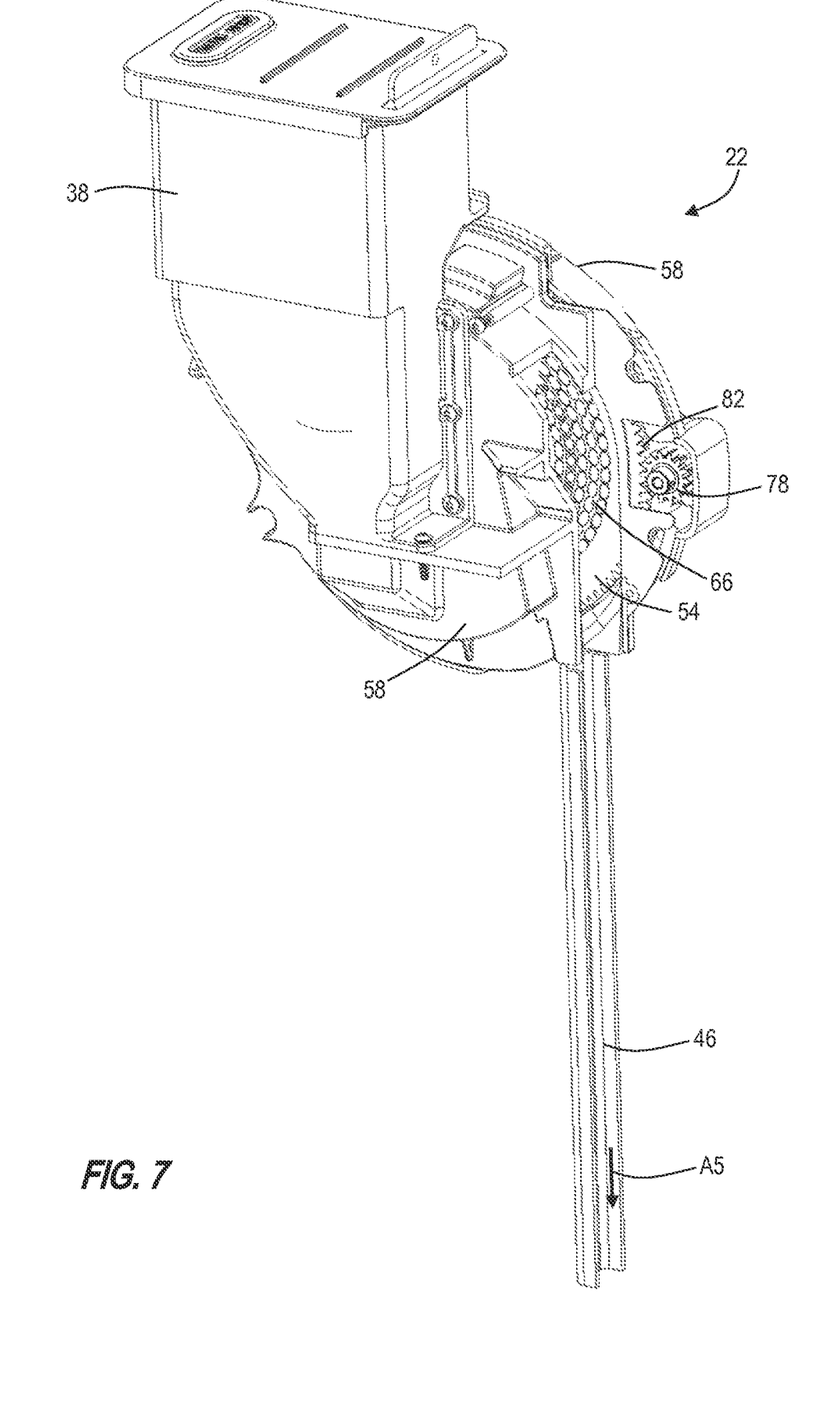
FIG. 7 is a perspective view of the meter and assembly of FIG. 4 with certain components removed.
Figure 8:
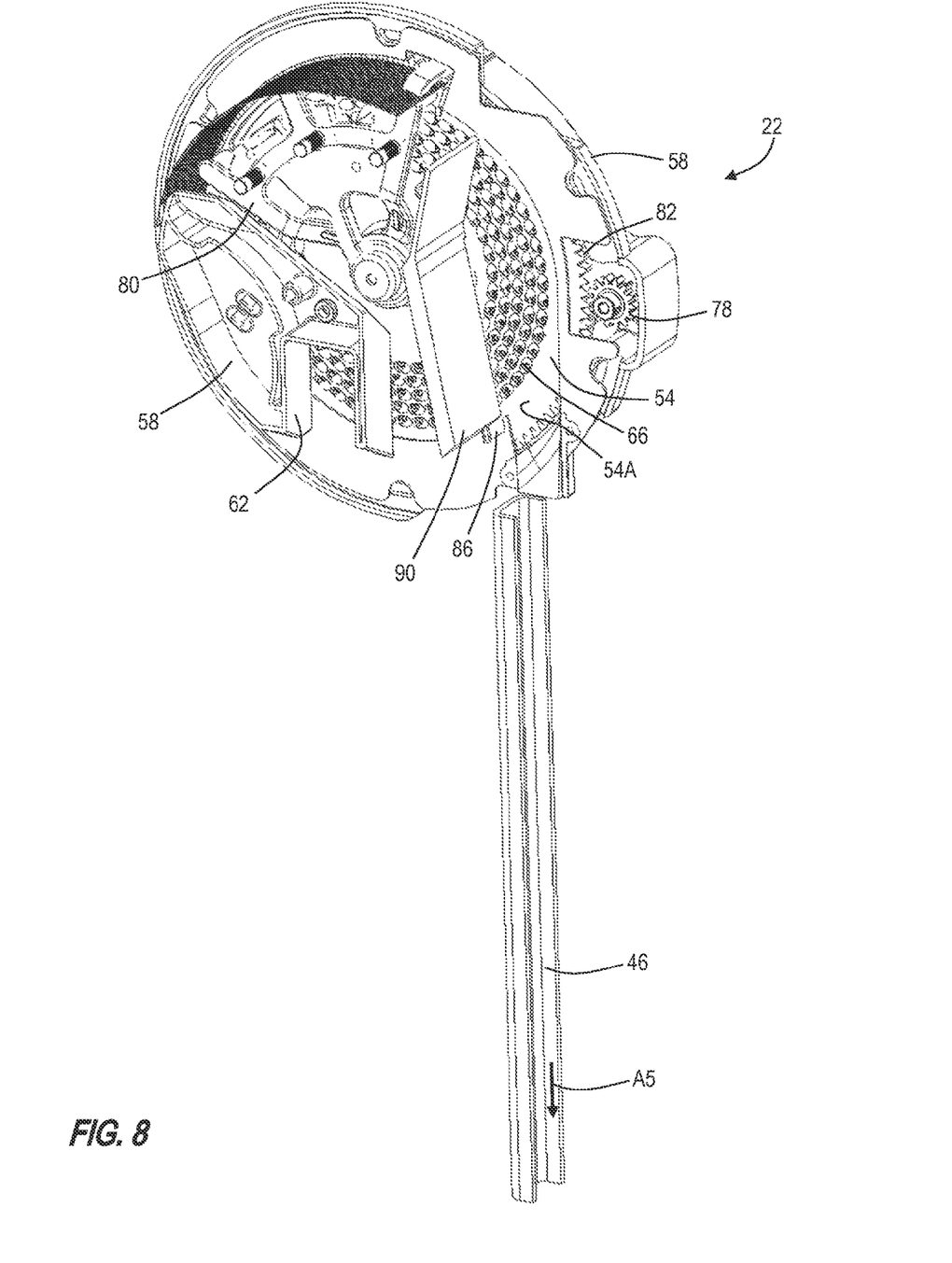
FIG. 8 is another perspective view of the meter and assembly of FIG. 7 with certain components removed.

Referring also to FIGS. 7-8, the singulating meter 22 includes a singulating disk 54 within the housing 58, which encloses the singulating disk 54. The singulating disk 54 includes a plurality of apertures 66 extending through the body of the disk 54 from a front surface 54A to an opposing rear surface (not shown). The apertures 66 are formed in circular rows set at different radial distances from the center of the disk 54. The disk 54 may alternatively have only a single circumferential row of apertures 66 at a constant radial distance. Each aperture 66 is sized to accommodate a single seed. A hose connection 70 (FIG. 5) is connected to the singulating meter housing 58 opposite the mini hopper 38 for a vacuum connection whereby the meter 22 is known as a vacuum seed meter. Alternatively, a positive pressure meter can be used instead of a vacuum meter where the seed side of the disk 54 is pressurized to an air pressure above ambient to create the pressure differential across the disk 54. A mechanical seed meter, such as a finger pick-up meter may also be used for the singulating meter.

The singulating meter 22 is driven by a motor 74 with a geared output shaft 78 (see FIGS. 5, 6, 8). The output shaft 78 engages with teeth 82 located about the periphery of the singulating disk 54 to rotate the disk 54 at a rate based on the speed of the motor and the gear ratio between the disk 54 and the output shaft 78. A doubles eliminator 80 ensures a one-to-one ratio of seed to each aperture 66. A brush 86 fixed with respect to the meter housing 58 by a brush mount 90 is positioned adjacent the disk 54, and more specifically, in contact with the front surface 54A.

The outlet conduit 46 serves as a common outlet from the interior of the meter housing 58 and may be in the form of a tube, hollow shaft, channel, belt, or similar means of conveyance suitable to transfer seed, fertilizer, or other agricultural particles to the ground. The outlet conduit 46 at the seed meter housing 58 is generally in vertical alignment with a seed release location on the disk 54 (e.g., around the three O'clock position in FIG. 8, near the shaft 78). Adjacent machinery (e.g., opener blade, plow, etc.) conventionally used to create a furrow in the ground into which the seeds are planted and close the furrow after the seeds have been planted are not herein described.

As further shown in FIG. 4, a seed sensor 50 is located at the common outlet 46 which can be in the form of an opening, or an elongated tube, channel or conduit. In other embodiments, the seed counter 50 may be positioned within the singulating meter housing 58.

In the second mode, the valve 30 places the volumetric meter 14 in communication with the bypass conduit 26. As best shown in FIGS. 4 and 6, the bypass conduit 26 is in the form of a hollow conduit or tube and leads to an inlet into the seed meter housing 58 generally in vertical alignment with the seed release location of the seed disk 54. In the illustrated embodiment, an air brake 42 is included in the bypass conduit 26 at the inlet to the seed meter housing. The air brake 42 has an internal spiral or cyclonic configuration with a top relief stack 44. In addition or alternatively, the air brake 42 may include a screen-based particle filter. In some embodiments the air brake 42 is integrally formed as one piece with the singulating meter housing 58. In other embodiments, an air brake 42 is not used and the bypass conduit 26 leads directly to the interior of the meter housing 58, which is in communication with the common outlet 46.

Arrow A1 designates the direction of the flow of seeds from the volumetric meter 14 into the inlet end of a supply line 34. In operation, and with the rotatable valve assembly 36 of the valve 30 positioned to direct the seeds toward the singulating meter 22 as designated by arrow A2 (FIG. 6), the valve 30 opens into the mini hopper 38.

The seeds are directed towards the singulating meter 22 and gather in the mini hopper 38 through the mini hopper inlet. When space within the singulating meter housing 58 permits, seeds from the mini hopper 38 enter the meter housing 58 via the mini hopper outlet 62 and are situated adjacent the front surface 54A of the singulating disk 54.

Driven by the motor 74, the singulating disk 54 rotates and, through the pressure differential between the front surface 54A and the rear surface of the disk 54 facilitated by the hose 70, the seeds within the housing 58 are either pulled or pushed into the apertures 66 and adhere to the front surface 54A of the disk 54. As the disk 54 rotates, the doubles eliminator 80 separates seed groups such that only one seed is rotationally carried per aperture 66. The rotating seeds travel a circumferential path with the apertures 66. The seeds eventually drop from their respective apertures 66 and, in some embodiments contact the brush 86 (FIG. 8). The pressure differential ceases at approximate contact with the brush 86 due to an internal divider on either side of the disk 54 disrupting the flow induced by the pressure differential. Upon displacement from the aperture 66, each seed 'drops' under the influence of gravity from the interior of the meter housing and, assisted by the configuration of the brush mount 90, into the common outlet conduit 46, falling past the seed counter 50 and to the ground, as indicated by arrow A5.

Figure 9:
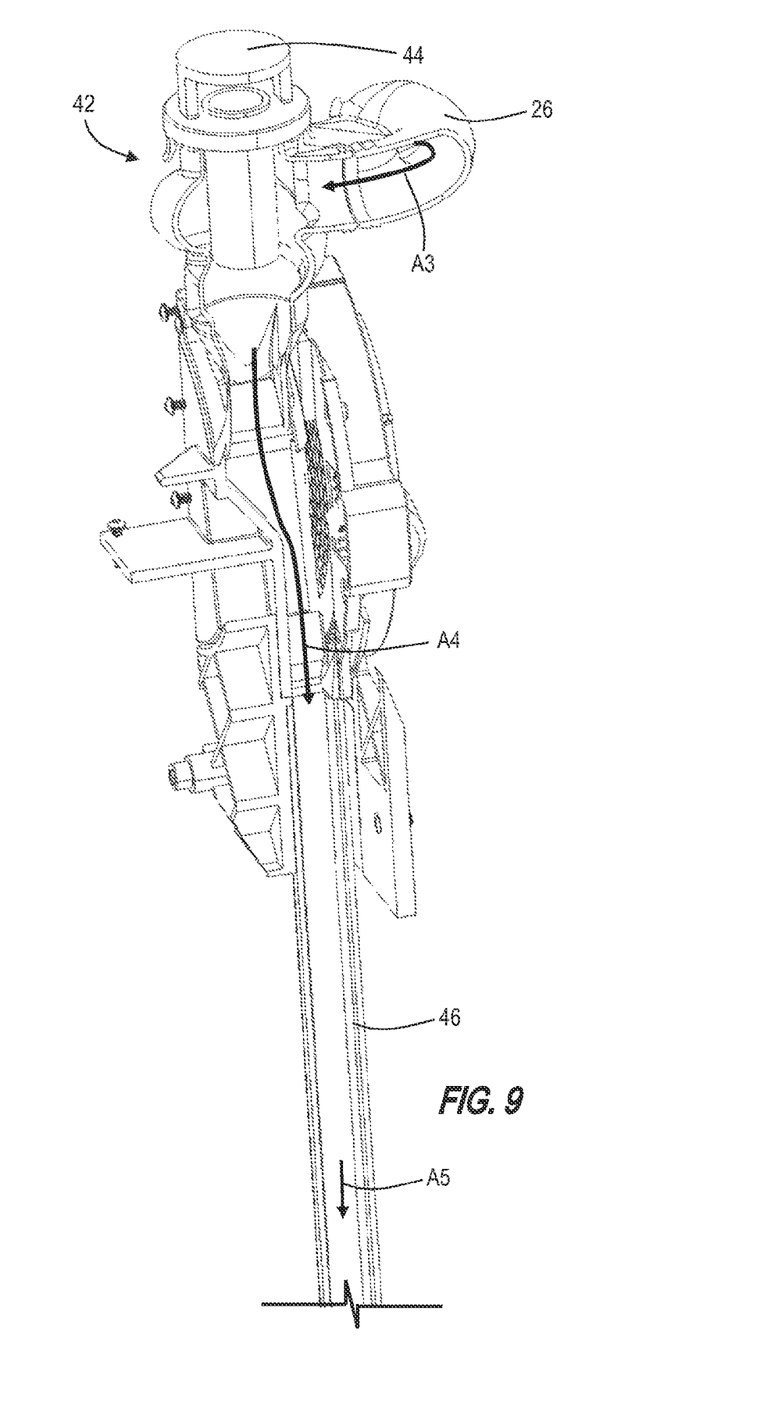
FIG. 9 is a partial perspective view of the bypass assembly illustrated in FIG. 4.

With the rotatable valve assembly 36 of the valve 30 positioned to direct the seeds toward the bypass conduit 26 as designated by arrow A3 (FIG. 6), the valve 30 opens into the bypass conduit 26, which carries the seeds to the seed meter housing 58 or as illustrated to the air brake 42. The air brake 42, which bleeds air from the top stack 44, decreases the velocity of the seeds prior to delivering, i.e., dropping, the seeds through the meter housing 58 into the common outlet 46. In this second mode, the seeds are not singulated, the disk 54 need not rotate, and the pressure differential generated through the use of the hose 70 can be turned off. In effect, a portion of the seed meter housing 58 acts as a partial duct from the air brake 42 to the common outlet 46, as shown by arrow A4 in FIG. 9. The common outlet 46 carries the seeds to the ground as indicated by arrow A5.

The seed sensor 50 counts the number of seeds which pass through both the singulating meter 22 and the bypass conduit 26 such that only one seed sensor 50 is required for both singulating and volumetrically metering (i.e., bypassing the singulating meter 22) the seeds. The seed sensor 50 communicates with a control unit (not shown), which tallies the number of planted seeds. The control unit may further measure or calculate the rate of seeding (e.g., seeds per unit of time) and relay this information to the operator of seed metering system 10B (or 10A) such that adjustments may be made to the rate of seeding or quantity of seeds planted. For example, the user could increase or decrease the rotational output speed of the motor 74 to adjust the number of seeds passing the seed sensor 50 from the singulating meter 22. The user could additionally adjust the volumetric metering to increase the rate of seeding through the bypass conduit 26.

The singulating meter 22 can be a secondary metering system option for a pre-existing and primary volumetric seed metering system. Alternatively and depending on the existing planting configuration, the seed metering subassembly 12 of FIGS. 4-5 can be inserted downstream of an existing volumetric meter 14 or provided as a removable or non-removable secondary metering system during initial manufacture. Alternatively, the seed metering system 10A, 10B can be a single system with both metering capabilities (i.e., volumetric, singulating) in a single unit. Utilizing this system, seeding can be switched from volumetric to singulating based on seed type and operator preference with minimal disruption. For example, it may be beneficial to plant unlike seeds in adjacent fields or planting areas. With a switch of the valve 30 (and depending on the configuration of the seed source 18 or multiple seed sources 18), one type of seed stored in a first seed source 18 may utilize the second mode for expedient seeding, and another type of seed stored in a second seed source 18 may utilize the first mode for more precise, calculated seeding. Alternatively, the user can vary metering strategies for a single type of seed by simply actuating the valve 30 between the two modes. Although described with respect to a single singulating meter 22 and bypass assembly, a seeding system would include multiple subassemblies 12, each associated with an individual row or furrow and configured to receive seeds from a single volumetric meter 14.

Various features of the disclosure are set forth in the following claims.

What is claimed is:

1. A seed metering system for selectively metering a plurality of seeds, the seed metering system comprising:
   an outlet of a source of seeds;
   a singulating meter in selective communication with the outlet; and
   a bypass conduit in selective communication with the outlet,
   wherein the seed metering system is operable in a first mode of operation in which the outlet communicates with the singulating meter to singulate the plurality of seeds,
   wherein the seed metering system is operable in a second mode of operation in which the outlet communicates with the bypass conduit and the plurality of seeds are not singulated, and
   wherein the seed metering system further includes an outlet common to and downstream of the singulating meter and the bypass conduit.

2. The seed metering system of claim 1, further comprising a volumetric metering system positioned upstream of the outlet of the source of seeds and operable to volumetrically meter the plurality of seeds.

3. The seed metering system of claim 1, further comprising a valve assembly operable to selectively communicate the singulating meter and the bypass conduit with the outlet of the source of seeds.

4. The seed metering system of claim 1, wherein the outlet common to and downstream of the singulating meter and the bypass conduit discharges the plurality of seeds to a furrow.

5. The seed metering system of claim 1, further comprising a seed sensor at the outlet common to and downstream of the singulating meter and the bypass conduit operable to count the plurality of seeds from the singulating meter and the bypass conduit.

6. The seed metering system of claim 1, wherein the bypass conduit further includes an air brake.

7. A secondary metering system for a seeding apparatus, the seeding apparatus including a primary metering system through which a plurality of seeds passes, the secondary metering system comprising:

a first path through which the plurality of seeds is configured to pass, the first path including a singulating meter in selective communication with the primary metering system to singulate the plurality of seeds to a furrow; and a second path through which the plurality of seeds is configured to pass, the second path including a bypass conduit in selective communication with the primary metering system, the second path bypassing singulation by the singulating meter to plant the seeds in the furrow.

8. The secondary metering system of claim 7, further comprising a control system operable to disconnect one of the first path or the second path to the primary metering system and connect the other of the first path and the second path to the primary metering system.

9. The secondary metering system of claim 7, wherein the control system is a three-way valve assembly.

10. The secondary metering system of claim 7, wherein the secondary metering system further includes an outlet common to and downstream of the first path and the second path.

11. The secondary metering system of claim 10, further comprising a seed sensor positioned at the outlet and operable to count the plurality of seeds.

12. A method of operating a metering system to meter a plurality of seeds, the method comprising:
    operating the metering system in a first mode, the first mode comprising the following steps:
        volumetrically metering a first portion of the plurality of seeds via a volumetric meter;
        singulating the first portion of the plurality of seeds via a singulating meter; and
        discharging the first portion of the plurality of seeds from the singulating meter,
    operating the metering system in a second mode, the second mode comprising the following steps:
        volumetrically metering a second portion of the plurality of seeds via the volumetric meter;
        passing the second portion of the plurality of seeds through a bypass conduit; and
        discharging the second portion of the plurality of seeds from the bypass conduit without singulating the second portion of the plurality of seeds;
    wherein, in both the first mode and the second mode, discharging the first portion and the second portion of the plurality of seeds includes
        transferring the plurality of seeds to a common outlet; and
        dispersing the plurality of seeds in a furrow.

13. The method of claim 12, further comprising switching between the first mode and the second mode by actuating a valve.

14. The method of claim 12, wherein, in both the first mode and the second mode, discharging the first portion and the second portion of the plurality of seeds includes:
    transferring the plurality of seeds to a common outlet; and
    detecting the plurality of seeds with a common seed sensor.

\* \* \* \* \*